United States Patent [19]

McCreary

[11] Patent Number: 4,719,818
[45] Date of Patent: Jan. 19, 1988

[54] TURBOCHARGER PLANETARY DRIVE

[75] Inventor: Charles H. McCreary, Oak Park, Ill.

[73] Assignee: General Motors Corporation, Detroit, Mich.

[21] Appl. No.: 901,406

[22] Filed: Aug. 28, 1986

[51] Int. Cl.[4] .............................................. F16H 3/44
[52] U.S. Cl. ................................... 74/750 R; 60/608; 74/785; 74/788
[58] Field of Search .................. 74/788, 785; 384/294, 384/295, 276, 279; 74/750 R; 60/606, 607, 608

[56] References Cited

U.S. PATENT DOCUMENTS

| | | | |
|---|---|---|---|
| 2,157,230 | 5/1939 | Cotterman | 74/785 X |
| 2,540,965 | 2/1951 | Schellinger | 74/785 X |
| 2,543,453 | 2/1951 | Fuller | 74/674 |
| 2,547,161 | 4/1951 | Johnson | 74/674 |
| 2,939,343 | 6/1960 | Berklege | 74/785 X |
| 3,037,349 | 6/1962 | Gassmann | 74/785 X |
| 3,074,297 | 1/1963 | Sommer et al. | 74/750 |
| 3,116,651 | 1/1964 | Hardy | 74/801 |
| 3,296,893 | 1/1967 | Shaffer et al. | 74/750 |
| 3,667,214 | 6/1972 | Addie | 60/608 |
| 4,114,477 | 9/1978 | Iverson | 74/768 |
| 4,445,337 | 5/1984 | McCreary | 60/608 |
| 4,604,908 | 8/1986 | Dolan | 74/788 X |
| 4,635,489 | 1/1987 | Imamura et al. | 74/785 X |

FOREIGN PATENT DOCUMENTS 887756  1/1962  United Kingdom .................. 74/788

Primary Examiner—Leslie Braun
Assistant Examiner—Dwight G. Diehl
Attorney, Agent, or Firm—Robert J. Outland

[57] ABSTRACT

A planet gear drive mounting in the carrier of a speed increasing planetary gear train for driving a diesel engine turbocharger or the like includes a supporting axle carrying an enlarged hub which engages and supports a bearing in the gear, the gear being lightened and the bearing area being enlarged by the large inner diameter of the bearing (preferably at least 50 percent greater than that of the axle) so that centrifugal force caused bearing loads are reduced and bearing loadings are minimized. Lubrication and other features are also disclosed.

7 Claims, 5 Drawing Figures

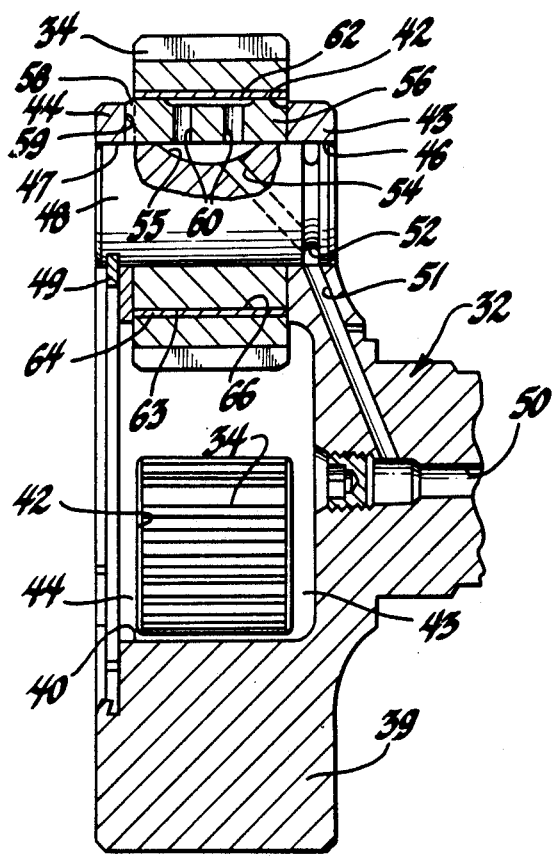
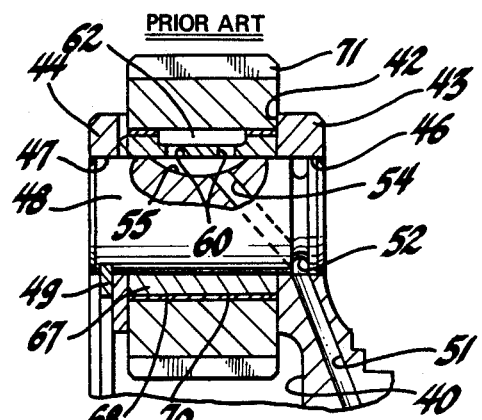
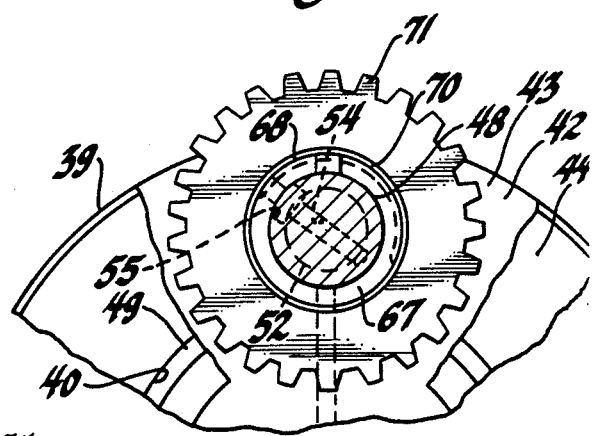
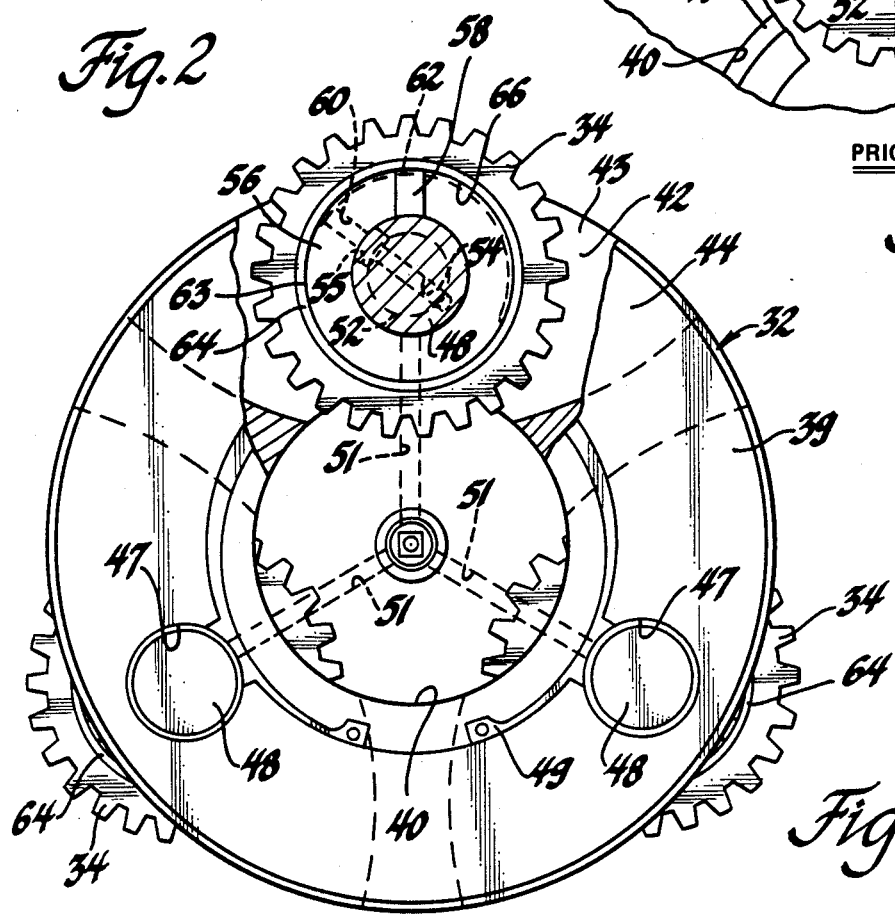

TURBOCHARGER PLANETARY DRIVE

TECHNICAL FIELD

This invention relates to turbochargers for engines, especially of the two cycle diesel type, wherein a speed increasing planetary gear drive train is provided. More particularly, the invention relates to improved capacity planet gear and bearing support arrangements for a rotatable planet carrier of a turbo gear drive train.

BACKGROUND

It is known in the art relating to engines, such as two cycle diesel engines, to provide an exhaust driven turbocharger (turbo) for supplying scavenging and charging air to the cylinders at above ambient pressures during operation at higher loads and speeds. A gear train may also be provided to drive the turbocharger at lower speeds and loads during which the engine exhaust energy is insufficient to maintain a turbo rotational speed adequate to deliver the required air supply. U.S. Pat. Nos. 3,667,214 Addie and 4,445,337 McCreary disclose two prior arrangements for gear driven turbochargers of this type. Both of these disclosures represent modifications of turbocharger drive arrangements which have been used extensively in diesel-electric railway locomotive engines produced by the Electro-Motive Division of General Motors as well as in numerous other applications of such engines.

SUMMARY OF THE INVENTION

The present invention provides an improvement in the drive train for turbochargers of the type previously referred to wherein the planet carrier supported planet gears and bearings are modified to reduce the centrifugal force developed by orbiting of the planet gears while increasing the effective bearing area to reduce overall planet bearing loading at comparable loads and speeds. Also, through this modification, bearing cooling is increased and bearing manufacture is simplified. The invention alternatively provides for operation at increased rotational speeds without an increase in bearing loads over operation of the previous design at lower speed levels.

The invention involves reducing the planet gear mass by increasing diameter of the inner bearing bore on which each planet gear rotates without increasing the exterior size of the planet gears. Additionally, the bearing surface for each planet gear is relocated from the exterior of a non-rotatable bearing member mounted on an axle shaft carried by the planet carrier to the interior of the planet gear bearing bore, where it rotates with the gear. This distributes wear over the entire bearing surface which is, furthermore, of increased area.

This change is accomplished, without changing the prior planet carrier and axle shaft arrangement, by disposing a new hub member of larger diameter in place of the previous bearing member, enlarging the internal gear diameter and providing an internal bearing surface forming the planet gear bearing bore, such as by adding a pressed-in bearing sleeve to each planet gear. Each hub member is mounted on its respective axle shaft and supports its planet gear while also providing internal passages and grooving for distribution of lubricating oil to the relocated internal bearing surface.

These and other features and advantages of the invention will be more fully understood from the following description of a specific embodiment of the invention taken together with the accompanying drawings.

BRIEF DRAWING DESCRIPTION

In the drawings:

FIG. 2 is an enlarged cross-sectional view of the planet carrier in the turbocharger of FIG. 1 showing the improved planet gear bearing and support arrangement according to the invention;

FIG. 3 is an end view of the planet carrier of FIG. 2 having a portion broken away to better show one of the planet gears;

FIG. 4 is a cross-sectional view similar to a portion of FIG. 2 and showing a comparable prior planet gear bearing and support arrangement; and FIG. 5 is a rear view similar to a portion of FIG. 3 and showing the illustrated portion of the prior arrangement of FIG. 4.

DETAILED DESCRIPTION

Figure 1:
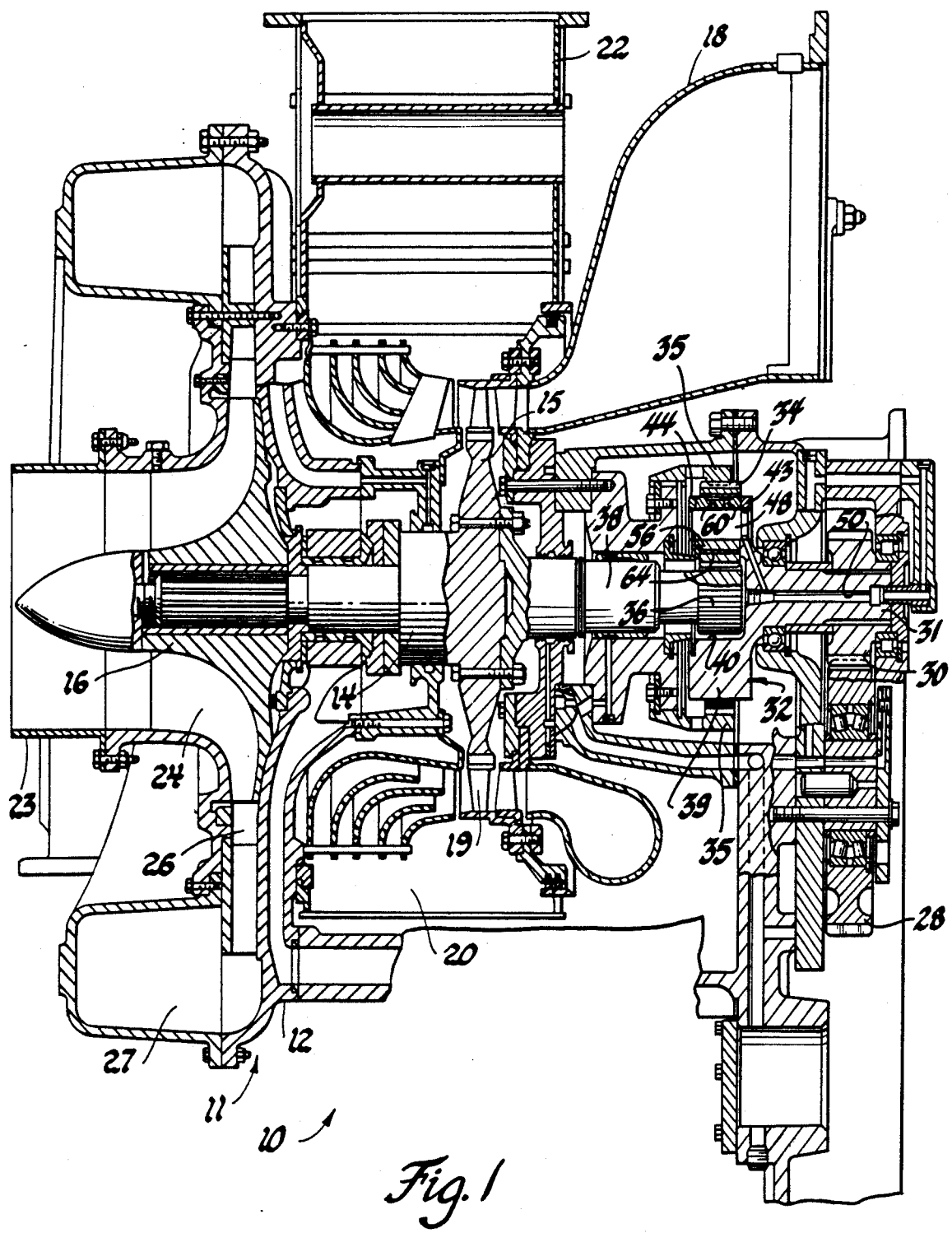
FIG. 1 is a fragmentary cross-sectional view of the rear end of a medium speed turbocharged two cycle diesel engine showing the turbocharger and drive train with an improved planetary gear arrangement in accordance with the invention.

Referring now to the drawings in detail, numeral 10 generally indicates a turbocharged two stroke cycle medium speed diesel engine, particularly of the railway diesel type previously referred to and having an improved planet gear and bearing support arrangement according to the invention. Engine 10 includes a fabricated crankcase, not shown, at the rear end of which there is mounted a gear and exhaust gas driven turbocharger generally indicated by numeral 11.

The turbocharger 11 includes a housing 12 supporting a rotor 14 that includes a turbine wheel 15 and a compressor wheel 16 mounted on a common shaft. The turbine wheel 15 is driven by exhaust gases discharged from the engine cylinders, not shown, and directed through an inlet duct and scroll 18 against blades 19 on the turbine wheel, where a portion of the exhaust energy is utilized for turning the rotor. The exhaust gases are then received in a collector chamber 20 and discharged through an exhaust duct 22.

Rotation of the rotor 14 turns the compressor wheel 16, drawing ambient air through an inlet duct 23 to rotating blades 24 on the compressor wheel, where the air is compressed. The compressed inlet air is then discharged through a diffuser 26 to an outlet scroll 27 from which it is carried by duct means, not shown, to the engine cylinders.

The non-illustrated crankcase portion of the engine 10 is conventionally provided with a plurality of pistons reciprocable within associated cylinders and connected with the throws of a crankshaft. The latter is, in turn, connected through gears and an overrunning clutch, not shown, with an idler gear 28 mounted in the turbo housing 12.

The idler gear 28 drives a carrier drive gear 30 which is mounted on a shaft end 31 of a planet carrier 32. Three planet gears 34 are rotatably mounted on the carrier in a manner to be subsequently described. These engage a ring gear 35 fixed to the turbo housing 12 and a sun gear 36 formed on one end of a drive shaft 38 attached to the turbocharger rotor 14. This gear train provides a large increase in rotational speed for driving the rotor 14 from the relatively slow speed engine crankshaft.

The planet carrier 32 and gears 34 are more clearly illustrated in FIGS. 2 and 3, which show the carrier 32 as having an annular end 39 opposite the shaft end 31 (shown in FIG. 1). The end 39 includes a circular recess 40, open axially at the end for receiving the sun gear 36 in the assembly of FIG. 1. Three annularly spaced radially extending cutouts 42 are also provided for receiving the planet gears 34.

The cutouts form axially spaced front walls 43 and rear walls 44 having longitudinally aligned front and rear openings 46, 47, respectively, in which pin-like axles 48 (or axle shafts) are received. A resilient retaining ring 49, received in suitable grooves in the carrier and axles, retains the axles in position in their openings 46, 47. The carrier 32 and axles 48 are unchanged from the prior arrangement and provide oil passages 50, 51 in the carrier, connecting through enclosed annular grooves 52 and passages 54 in the axles 48 with recesses 55 in outer surfaces of the axles.

In accordance with the invention, enlarged hubs 56 are press fitted on the axles in non-rotatable positions fixed by appropriate means such as dowels or, as shown, lugs 58 received in grooves 59 in the rear walls 44. The hubs 56 include radial oil passages 60 communicating the recesses 55 of the axles 48 with suitable distribution means such as grooves or, as illustrated, semi-annular distribution recesses 62 on the exterior surfaces 63 of the hubs. Rotatably supported on these surfaces 63 are bearings, such as bearing sleeves 64, which are press fitted within planet gears 34 to form enlarged bored thereof. The sleeves present unbroken inner bearing surfaces 66 to the hubs 56 so that even wear distribution on the bearings is obtained. Obviously, the bearing surfaces 66 could be formed in any other suitable manner, e.g. by plating in place, to define the planet gear bores.

FIGS. 4 and 5 illustrate a prior arrangement in which like reference numerals have been used for like parts. The prior arrangement differs in that the bearings 67 are formed by smaller diameter versions of the separate hubs 56 of the improvement on the outer diameter 68 of which a high load bearing material 70, such as silver, has been plated or otherwise deposited. The bearings 67 include oil passages 60 and recesses 62 and, like the hubs 56, are non-rotatable. As a consequence, all the bearing loads are carried by the radially inward portions of the bearing surface which, thus, receive all the wear.

In addition, the planet gears 71 of the prior arrangement have inner diameters rotatably carried on the bearings 67 which are about one quarter smaller than the inner bearing diameters of the improved version. Thus, the gears 71 are substantially heavier than those of the improved version.

In operation of the improved version of FIGS. 1-3, oil delivered through the passages and grooves 50, 51, 52, 54 to the recesses 55 of the axles flows outward through passages 60 to the recesses 62 of the hubs 56 from which it is carried between the bearing and hub surfaces during rotation of the planet gears 34. The planet carrier 32 rotates whenever the rotor 14 is in motion and causes the planet gears to orbit, as well as rotate, at relatively high rotational speeds. The masses, of the planet gears thus develop significant centrifugal forces which act on the bearing surfaces. Because of the high speeds involved, these centrifugal forces impose higher loads on the bearings than the forces required to drive the turbocharger in its highest speed, unloaded condition.

In an alternative embodiment of turbocharger gear drive, not shown, a one way overrunning clutch is located between the ring gear 35 and the turbo housing 12 so that the ring gear is fixed in one direction when the gear train is driving the turbo but is allowed to rotate when the rotor speed rises above the engine driven speed. The arrangement allows the maximum planet carrier speed to be limited to that caused by the engine operating speed. This is a substantially lower speed than that reached when the carrier speed is tied to the rotor speed as in the described embodiment where the overrunning clutch is between the idler gear 28 and the engine crankshaft. However, the improved features of the present invention are applicable to either arrangement.

As compared to the prior version of the planet gear and bearing arrangement, the centrifugal forces of the improved version are much reduced because of the reduced masses of the planet gears with their larger inner diameters. In addition, the planet bearing loads are further reduced because the bearing diameters are larger and the load carrying surfaces are, therefore, of greater area.

Furthermore, the wearing surface 66 of each of the improved planet bearings 64 is greatly increased, covering the whole circumference of the bore on which loads are sequentially applied, rather than only the inner half of the bearing as in the prior version. The improvement thus distributes the bearing wear more evenly over a much larger bearing surface area. Also, the temperatures reached locally on the improved bearing surface will be lower because the load passes across the bearing surface instead of being concentrated at one location as in the prior version. Thus, the bearing surfaces or sleeves 64 may be made of any suitable material such as aluminum, bronze, silver or the like.

It should also be noted that the simple pressed-in bearing sleeves, if used, and the unplated steel hubs of the improved version should be more easily manufactured than the prior plated bearing members. The improved hubs and reduced mass planet gears with their internal bearing surfaces may also be used as replacement parts in turbochargers of the previous design to give these earlier turbochargers a capability for higher speed operation and potentially longer operating life between overhauls.

For comparison purposes, it is noted that the planet gears of the prior version had bore diameters of about 1.7 inches and weight of approximately 2.5–2.6 pounds carried on fixed bearings supported by axles of 1.25 inch diameter. The improved version proposed in accordance with the embodiment previously described substituted planet gears with bearing bore diameters of about 2.25 inches and weight of about 1.7–1.9 pounds with the bearing sleeves installed. These assemblies are carried on hubs supported by the same sized axles of 1.25 inches diameter.

Note that in the prior version, the gear inner diameters are only about 35–40 percent larger than the diameters of the supporting axles. The improved version differs in having gear inner diameters at least 50 percent larger than the diameters of their respective shafts. In particular, the gear bores are about 80 percent larger than their shafts in the described embodiment, leading to the substantial reduction in gear weight previously set forth.

While the invention has been described by reference to one preferred embodiment, it should be understood that numerous changes could be made within the spirit and scope of the inventive concepts described. Accordingly it is intended that the invention not be limited to the disclosed embodiment, but that it have the full scope permitted by the language of the following claims.

The embodiments of the invention in which an exclusive property or privilege is claimed are defined as follows:

1. A turbocharger planetary drive train having an engine driven planet carrier rotatable at a high speed, a ring gear fixed during a drive mode, a sun gear drivably connected with a turbocharger compressor and a plurality of planet gears rotatably carried by the planet carrier and engaging the sun and ring gears for driving the compressor at an elevated speed greater than that of the planet carrier,
- wherein the planet carrier includes axially spaced end walls extending radially outward from a rotational axis of the carrier with means in said walls receiving a plurality of removable axles in angularly spaced locations between said walls, said planet gears being rotatably supported on the axles by bearings, and the improvement wherein, the planet gears are made light by having large internal bores of at least 50 percent larger diameter than the diameters of their respective supporting axles, the bearings form said large internal bores and comprise sleeves fixed to the planet gears, said sleeves having internal bearing surface unbroken by grooves or openings, and separate removable large hubs are fixedly mounted on the axles within and engaging the bearings for rotation of the planet gears and bearings on the axle carried hubs, whereby the specific loading and wear on the planet gear bearings is minimized by the relatively low centrifugal forces of the light planet gears on their bearings and the high load carrying area of the large bearings.

2. A turbocharger planetary drive train as defined in claim 1 wherein said internal bores of the planet gears have diameters at least 75 percent larger than the diameters of their respective axles.

3. A turbocharger planetary drive train as defined in claim 1 wherein the axles are provided with outwardly opening recesses into which oil is delivered from the planet carrier for lubricating the planet gear bearings and wherein the improvement further includes passage means in the hubs connecting with outwardly opening recesses therein and leading, in assembly, from the axle recesses to the bearings for carrying lubricant to the bearing engaging surfaces of the hubs and bearings.

4. A turbocharger planetary drive train as defined in claim 3 wherein said internal bores of the planet gears have diameters at least 75 percent larger than the diameters of their respective axles.

5. A planet gear and hub assembly for use in a planetary gear drive having a planet carrier with axially spaced end walls extending radially outward from a rotational axis and means in the walls receiving at least one removable axle for supporting the gear and hub assembly, said assembly comprising a planetary gear receiving a bearing, the bearing being fixed to the planet gear and defining a large central opening with an inwardly facing bearing surface unbroken by grooves or openings, and an annular hub having a cylindrical outer surface receivable within and engagable with said bearing surface, said hub having a central opening coaxial with its outer surface for receiving said axle of the planet carrier within the hub to support the planetary gear and hub assembly on the carrier, the bearing surface of said large central opening of the gear having a diameter at least 50 percent larger than the hub supporting diameter of said axle.

6. An annular hub having a cylindrical outer surface receivable within said engagable with a bearing of an associated planet gear said bearing comprising a sleeve fixed to said associated planet gear, and said sleeve having an internal bearing surface unbroken by grooves or openings, a central opening coaxial with the outer surface for receiving an axle of a planetary carrier within the hub to support the hub and gear on the carrier, an oil passage between the central opening and an outwardly opening distribution recess in the outer surface for the delivery of lubricating oil to the associated bearing surface wherein the cylindrical outer surface has a diameter at least 50 percent greater than that of the axle receiving central opening.

7. An annular hub as in claim 6 wherein the diameter of the bearing receiving cylindrical outer surface is at least 75 percent greater than that of the axle receiving central opening.

* * * * *